(12) United States Patent
Kealey et al.

(10) Patent No.: US 9,105,194 B1
(45) Date of Patent: Aug. 11, 2015

(54) SEMI-NETWORK INDEPENDENT EDUCATIONAL ELECTRONIC EXAM ENGINE

(71) Applicant: Pearson Education, Inc., Upper Saddle River, NJ (US)

(72) Inventors: Brendan Jared Kealey, Iowa City, IA (US); Paul Joseph Arens, Coralville, IA (US); Adam Walter Krapfl, Mount Vernon, IA (US); Paul Christopher Grudnitski, Torrance, CA (US); Robbie Allen Nielsen, Prior Lake, MN (US); James Tavis Setaro, Austin, TX (US)

(73) Assignee: Pearson Education, Inc., Upper Saddle River, NJ (US)

( * ) Notice: Subject to any disclaimer, the term of this patent is extended or adjusted under 35 U.S.C. 154(b) by 0 days.

(21) Appl. No.: 14/222,317

(22) Filed: Mar. 21, 2014

(51) Int. Cl.
  *G09B 5/08* (2006.01)
  *G09B 7/00* (2006.01)
(52) U.S. Cl.
  CPC ........................ *G09B 7/00* (2013.01)
(58) Field of Classification Search
  CPC ........................................................ G09B 5/08
  USPC ......................................................... 434/362
  See application file for complete search history.

(56) References Cited

U.S. PATENT DOCUMENTS

| 7,483,670 | B2 | 1/2009 | Walker et al. | |
| 2005/0182306 | A1* | 8/2005 | Sloan | 600/300 |
| 2006/0282896 | A1 | 12/2006 | Qi | |
| 2009/0271517 | A1* | 10/2009 | Naylor et al. | 709/227 |
| 2012/0034590 | A1* | 2/2012 | Hallsten | 434/351 |
| 2013/0080870 | A1* | 3/2013 | Jacobs | 715/224 |
| 2013/0209982 | A1* | 8/2013 | Rooks et al. | 434/350 |
| 2014/0186814 | A1 | 7/2014 | Rooks et al. | |

OTHER PUBLICATIONS

ExamSoft: How it works, Web Archive, Web. Mar. 17, 2013. < https://web.archive.org/web/20130317090511/http://learn.examsoft.com/how-it-works-4>.*
Javascript—Browser Detect and CSS Switch, Web Archive, Web. Jul. 14, 2012. < https://web.archive.org/web/20120714071945/http://www.dreamincode.net/forums/topic/30206-javascript-browser-detect-and-css-switch>.*

(Continued)

*Primary Examiner* — Sam Yao
*Assistant Examiner* — Thomas Hong
(74) *Attorney, Agent, or Firm* — Kilpatrick Townsend & Stockton LLP

(57) ABSTRACT

Embodiments relate to electronic administration of an academic examination. Execution of an exam file on a student device causes exam questions to be presented. Input from students is translated into responses. Response data identifying one or more responses and a student identifier may be transmitted from the student user device to another device during an exam period or at the end of the exam period. However, the transmission may be explicitly or functionally conditioned by network connection strength, network availability and so forth. When the condition is not satisfied or when a transmission fails, response data is locally and securely cached at the student user device. The response(s) is immediately locked or locked at the end of an examination period, such that a student user can no longer modify the response(s). The student user device subsequently transmits the response data (e.g., when the transmission condition is satisfied).

24 Claims, 10 Drawing Sheets

(56) References Cited

OTHER PUBLICATIONS

Automatic Reconnect, Web Archive, Web. Dec. 22, 2011. < https://web.archive.org/web/20111222094650/http://wiki.tcl.tk/12379>.*
Pearson Education, Inc., *TestNav 7 Combined Technical Guide*. Feb. 16, 2012.
U.S. Appl. No. 14/194,160, filed Feb. 28, 2014 by Jesse E. Peterson, 53 pages.
U.S. Appl. No. 14/222,350, filed Mar. 21, 2014 by Brendan Jared Kealey, 48 pages.
First Action Interview Pilot Program Pre-Interview Communication mailed on May 1, 2014 for U.S. Appl. No. 14/194,160, 4 pages.
IP Address Blocking, Web Archive, Web. Jan. 25, 2013. <https://web.archive.org/web/20130125194757/http://en.wikipedia.org/wiki/IP_address_blocking>, hereinafter IPBlock.
Screened Subnet Firewall, Web Archive, Web. Jan. 1, 2013. <https://web.archive.org/web/20130113065341/http://www.vtcif.telstra.com.au/pub/docs/security/800-10/node58.html>.
Final Office Action mailed on Sep. 12, 2014 for U.S. Appl. No. 14/194,160, 13 pages.
Final Office Action mailed on Sep. 11, 2014 for U.S. Appl. No. 14/222,350, 13 pages.
BitZipper FAQ, Web Archive, Mar. 10, 2013. <https://web.archive.org/web/20130310110014/http://www.bitzipper.com/faq_run.html>.
First Action Interview Pilot Program Pre-Interview Communication mailed on Jun. 10, 2014 for U.S. Appl. No. 14/222,350, 4 pages.
Non-Final Office Action mailed on Jan. 30, 2015 for U.S. Appl. No. 14/194,160, all pages.

* cited by examiner

SEMI-NETWORK INDEPENDENT EDUCATIONAL ELECTRONIC EXAM ENGINE

BACKGROUND

This disclosure relates in general to methods and systems for securely electronically distributing exam files to student user devices and securely receiving exam responses from student user devices.

Traditionally, tests were administered by passing out sheets of paper with exam questions. Students would record their answer on the paper or on an answer sheet, and the paper and/or answer sheet would be collected at the end of an exam period. Now, exams can be administered electronically using computers. However, an array of complications surrounds electronic exams. For example, electronic exams must be reliably made available to student user devices at appropriate times. Further, exam responses must be reliably communicated from student user devices at appropriate times. The distribution and response collection must occur despite any complications such as network instability, device variability, software variability, system load, etc.

SUMMARY

In one embodiment, the present disclosure provides a method and system for electronically transmitting an exam power file from a central server to a proctor electronic device. The exam power file can then be cached at the proctor electronic device until exam time. At exam time, the power file can be transmitted from the proctor device to one or more electronic student user devices. This can reduce the load on the central server at common exam times.

The power exam file can include a set of files. At least one first file can be compatible with a first browser, and at least one second file can be compatible with a second browser. A student user can open a browser (e.g., of his/her choosing) on a student user device. The browser can be automatically detected, and one or more files compatible with the browser can be identified and executed. The execution can cause exam questions to be presented using the browser and can cause responses to the questions to be received using the browser. Thus, the interface and keystroke responses present during the exam can be consistent with those that the user is accustomed to from the browser.

Depending on the embodiment, responses may be transmitted from the student user device to the proctor device or central server during an exam period or at the end of the exam period. In either case, the transmission may be explicitly or functionally conditioned by network connection strength or other factors (e.g., system load). For example, a student user device may assess a variable (e.g., network connection strength) to determine whether the variable passes a transmission condition. As another example, a student user device may attempt a transmission and detect whether the transmission is successful or fails. When the condition is not satisfied or when a transmission fails, one or more responses may be locally and securely saved at the student user device. The response(s) may be immediately locked or locked at the end of an examination period, such that a student user can no longer modify the response(s). The student user device can subsequently attempt to transmit the response(s), e.g., upon detecting that a transmission condition is satisfied, at a prescribed time after a previous attempt, at a prescribed time after an end of an examination period, receiving a pull request from a proctor device or central server, etc.

In some embodiments, a system for administering academic examinations and conditioning transmission of examination responses on results of a connection assessment is provided. An exam retriever receives one or more electronic examination files. An exam access engine executes the one or more electronic examination files. The execution causes an academic exam question to be presented via an interface of the electronic student device and input corresponding to a response to the academic exam question to be received via the interface. A response engine translates the input to the response and generates response data. The response data includes an identifier of the academic exam question, an identifier of the response, and an identifier of the electronic student device or of a student. A connection assessor determines a connection variable by assessing one or more network connections available to the electronic student device. The connection assessor also evaluates a transmission condition based on the connection variable. A response transmitter transmits the response data. Determining that the transmission condition is satisfied causes the response data to be transmitted to another device at a first time. Determining that the transmission condition is not satisfied causes the response data to be retrieved from storage at a second time after the first time and further causes the retrieved response data to be transmitted to the other device.

In some embodiments, a computer-implemented method is provided for electronically administering academic examinations and conditioning transmission of examination responses on results of a connection assessment. One or more electronic examination files are received at an electronic student device. The one or more electronic examination files are executed. The execution causes an academic exam question to be presented via an interface of the electronic student device. The execution further causes input corresponding to a response to the academic exam question to be received via the interface. The input is translated to the response. Response data is generated that includes an identifier of the academic exam question, an identifier of the response, and an identifier of the electronic student device or of a student. A connection variable is determined by assessing one or more network connections available to the electronic student device. A transmission condition is evaluated based on the connection variable. Upon determining that the transmission condition is satisfied, the response data to another device is transmitted at a first time. Upon determining that the transmission condition is not satisfied, the response data is retrieved from storage at a second time after the first time, and the retrieved response data is transmitted to the other device.

In some embodiments, a proctor device for caching academic examinations and distributing the academic examinations to student electronic devices is provided. An exam retriever receives, from a central server and at a first time, an electronic examination file. Execution of the electronic examination file causes an academic exam question to be electronically presented and a response to the academic exam question provided via a computer interface to be received. The exam retriever further caches the electronic examination file in a memory at the proctor device. An exam access engine identifies a set of student electronic devices. Each student electronic device in the set of student electronic devices is authorized to receive the electronic examination file at an authorized time. The exam access engine determines, at a second time, that the electronic examination file is allowed to be distributed to at least one student electronic device in the set of student electronic devices. The second time is after the first time. A file transmitter transmits the electronic examination file from the proctor device to a subset of the set of student electronic devices.

In some embodiments, a computer-implemented method for electronically administering academic examinations using proctor-device caching is provided. An electronic examination file is received at a first time at a proctor device and from a central server. Execution of the electronic examination file causes an academic exam question to be electronically presented and a response to the academic exam question provided via a computer interface to be received. The electronic examination file is cached at the proctor device. A set of student electronic devices is identified. Each student electronic device in the set of student electronic devices is authorized to receive the electronic examination file (e.g., at an exam initialization time). At a second time, the proctor device determines that the electronic examination file is allowed to be distributed to at least one student electronic device in the set of student electronic devices. The second time is after the first time. The electronic examination file is transmitted to a subset of the set of student electronic devices.

In some embodiments, a computer program product is provided that is tangibly embodied in a non-transitory machine-readable storage medium. The computer program product includes instructions configured to cause one or more data processors to perform actions including part or all of a method disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
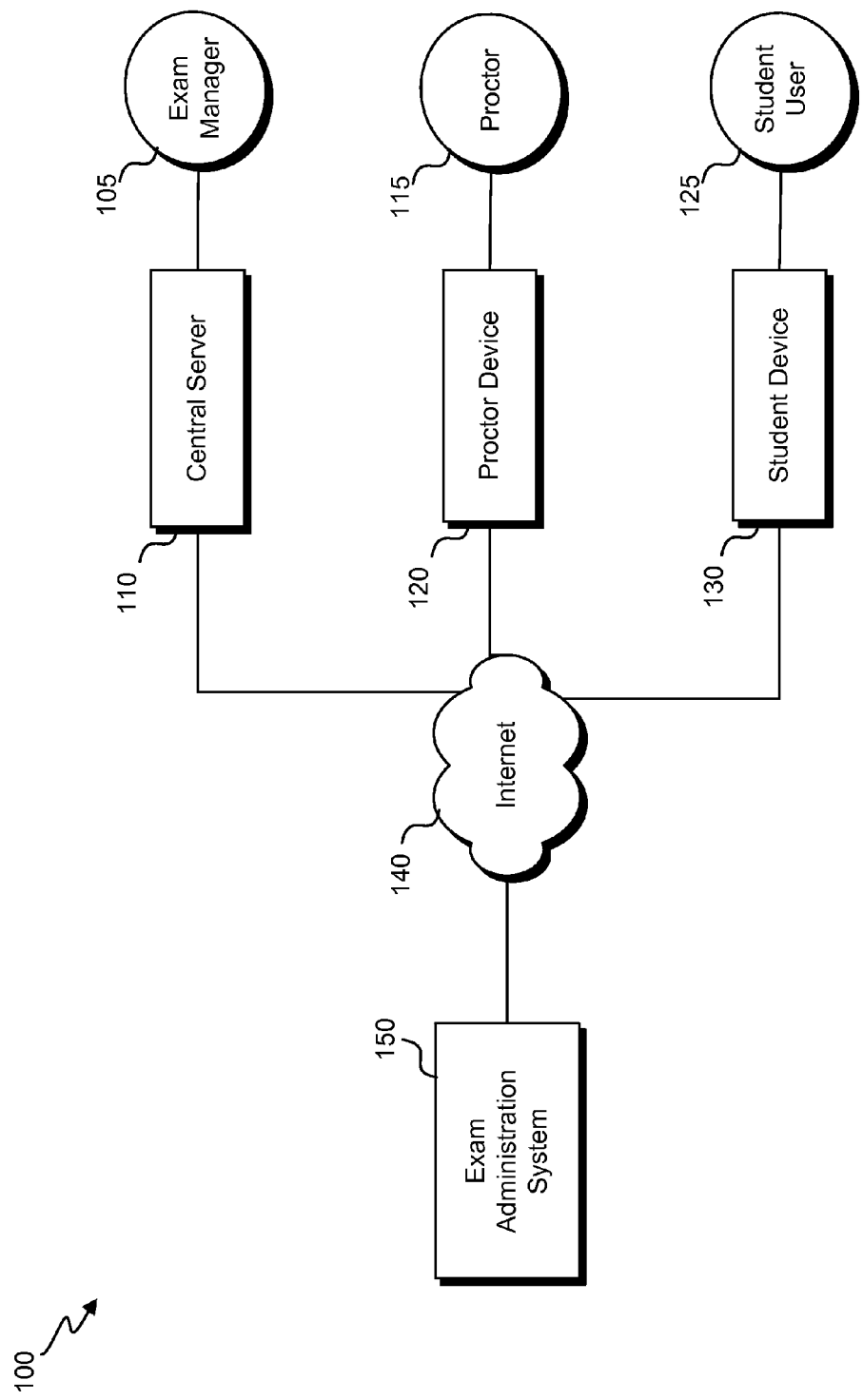
FIG. 1 depicts a block diagram of an embodiment of an exam administration interaction system.

Referring first to FIG. 1, a block diagram of an embodiment of an exam administration interaction system 100 is shown. An exam manager 105, proctor 115 and/or student user 125 can interact with an exam administration system 150 via respective devices 110, 120 and/or 130 and a network 140, such as the Internet, a wide area network (WAN), local area network (LAN), short-rage network or other backbone. Network 140 can include a wired connection or wireless connection. In some instances, multiple networks are used. For example, student device 130 and proctor device 120 may be connected over a wired local connection, and proctor device 120 and central server may be connected over a wireless Internet connection.

In some embodiments, exam administration system 150 is made available to one or more of exam manager 105, proctor 115 and/or student user 125 via an app (that can be downloaded to and executed on a portable electronic device) or a website. It will be understood that, although only one exam manager 105, proctor 115 and/or student user 125 are shown, system 100 can include multiple exam managers 105, proctors 115 and/or student users 125.

Central server 110, proctor device 120 and/or student device 130 can each be a single electronic device, such as a computer or hand-held electronic device (e.g., a smartphone), or a system that includes multiple devices and/or components. The device(s) 110, 120 and/or 130 can comprise a computer, such as the desktop computer, a laptop computer or a tablet. In some instances, a party 105, 115 and/or 125 uses different devices at different times to interact with the exam administration system 150. For example, user 125 may use different computers to complete a single exam or to complete different exams.

One or more exam managers 105 can generate, select or otherwise define exams. For example, an exam manager may input questions and answer choices to include on an exam and may identify correct answers. An exam manager 105 may identify a course to associate with an exam. An exam manager 105 may identify one or more student users (e.g., by name or user identifiers), student devices, proctors, classrooms, and/or proctor devices that indicate which devices an exam is to be made available to. An exam manager 105 can further identify an exam start time (at which the exam can be begun by a student) and/or an end time (at which the exam is to be completed). In some instances, an exam start period can be identified and an exam duration, such that the user can begin the exam any time during the start period and the exam is only made available for the duration.

Central server 110 can generate one or more exam files based on exam-defining inputs. The exam files can be structured such that execution of the files or reading of the files will cause exam questions to be presented (e.g., using a browser) on a student device and cause student responses to be collected. Different exam files can be generated to be compatible with different browsers or applications. In some instances, central server 110 can compress a set of exam files into a power file, which can subsequently be decompressed by a proctor device or student device. The power file, exam files in the power file and/or other exam files can be encrypted.

The power file (or one or more other exam files) can be transmitted from central server 110 to a proctor device 120. In one instance, the transmission occurs in response to a pull request from proctor device 120. For example, a proctor 115 (e.g., an instructor, exam proctor or administrator) can log into proctor device 120, identify a course and/or exam and indicate that corresponding exam materials are to be retrieved. Such actions could occur the day of an exam or before. In one instance, the transmission occurs at a scheduled time, which may be a set time before an exam start time. The set time may vary across exams, such that a maximum distribution load on central server 110 is reduced.

In some instances, proctor device 120 decrypts an exam power file (and/or exam files in the power file or other exam files) and/or decompresses an exam power file. The power file and/or exam files (originally in the power file or other files) can be transmitted from proctor device 120 to one or more student devices 130. In one instance, the transmission occurs in response to a pull request from student device 130. For example, a student 125 can log into student device 130, open a browser and enter input corresponding to a request to begin an exam. The request itself can serve to trigger the transmission of the power file or other conditions can additionally be evaluated (e.g., to confirm that a current time is within a transmission time window). In one instance, the transmission occurs at a scheduled time, which may be an exam start time or a set time before an exam start time. In some instances, student device 130 decrypts an exam power file (and/or exam files in the power file or other exam files) and/or decompresses an exam power file.

Proctor device 120 and one or more student devices 130 may, or may not, be located near each other. For example, proctor device 120 and one or more student devices 130 may be located in a same classroom, building, city or state. One or more student devices 130 may be owned and/or operated by an educational entity (e.g., school) and may be assigned as being part of a classroom or building. In some instances, one or more student devices 130 are owned by respective students. Student devices 130 may, or may not, be registered with central server 110 or exam administration system 150.

A student 125 can open a browser (before or after transmission of one or more exam files from proctor device 115), and student device 130 can detect the type of browser. Following receipt of the exam file(s) and at an exam start time (e.g., associated with an exam and/or as determined based on input from a proctor 115 or student 125), student device 130 can detect one or more exam files (or parts of exam files) compatible with the open browser and read and/or execute the compatible files or file parts. Such reading and/or execution can cause one or more exam questions to be presented to student 125 via student device 130 (e.g., using the open browser). Execution can cause one or more student responses to be detected. The responses may be saved locally and/or transmitted to proctor device 120 and/or central server 110. In one instance, responses are saved locally until the student submits an exam or response, a condition is satisfied (e.g., based on a network connection), an exam end time passes, a response pull is received from proctor device 120 and/or central server 110, a response is successfully transmitted to proctor device 120 and/or central server 110, and/or other factors.

In some instances, locally stored responses can be securely stored. For example, responses can be stored such that a student 135 is unable to modify a response once the response is stored, once the response is submitted, once the student indicates that the exam is completed, once an exam end time passes and/or once a locking condition is satisfied, and so on. Locally stored responses can be associated with an identifier of student 125 and/or student device 130 and can be encrypted. Locally stored responses can be transmitted to proctor device 120 and/or central server 110 at a set time and/or when a condition is satisfied (e.g., when a network strength is above a threshold). In one instance, transmission is repeatedly attempted until it is successful. In some instances, responses are fully or partially evaluated prior to a transmission (e.g., at student device 130 or proctor device 120). For example, responses can be compared to a "correct" answer as identified in a power file and/or encrypted exam file.

Thus, exam administration system 150 can provide a reliable technique for administering exams. Caching on proctor devices can reduce bursts of high system load on a central server at common exam times, such that exams can be reliably retrieved and distributed to student devices. Local and secure storage of responses on student devices can also allow for exams to be provided in an uninterrupted manner (e.g., despite any network problems) but can nonetheless ensure that students are not allowed to add or modify responses outside of a prescribed examination time period.

Figure 2:
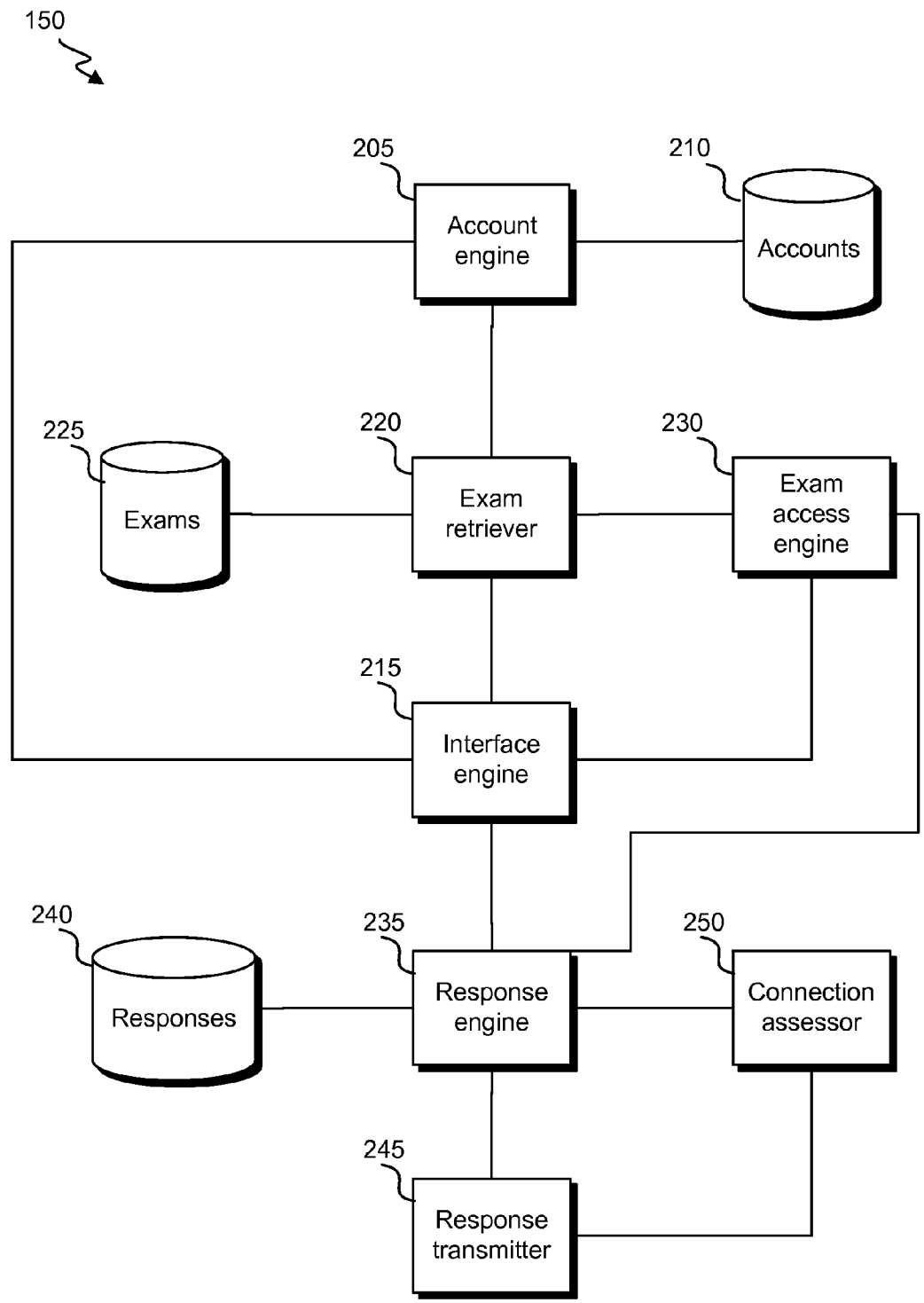
FIG. 2 depicts a block diagram of an embodiment of an exam administration system.

Referring next to FIG. 2, a block diagram of an embodiment of exam administration system 150 is shown. Exam administration system 150 can be, in part or in its entirety, in the cloud. In some instances, at least part of exam administration system 150 is present on a device, such as a student device 130 or proctor device 120. Exam administration system 150 can include a distributed system (e.g., part residing in central server 110 and part on student device 130, part residing in the cloud and part on student device 130, part residing in central server 110 and part on proctor device 120 and part on student device 130, etc.). Further, it will be appreciated that each of one or more components of exam administration system 150 may reside on multiple devices. For example, each of a proctor device 120 and student device 130 may include an account engine 205 to verify an identity of a proctor and student, respectively, and each device may further include an interface engine 215 to receive inputs and present outputs. The operation of a given component may depend upon the type of device.

Exam administration system 150 includes an account engine 205, which generates and maintains accounts for proctors 115 and/or students 125 and verifies identities of proctors 115 and/or students 125. Account engine 205 can collect, e.g., personal (e.g., name, email address, residence address, telephone number and occupation), academic (e.g., grade level, current grade, school, one or more teachers, interests, course history, and course enrollment), and/or login (e.g., username and password) information. Account information can be stored in account data store 210. Further, account engine 205 can characterize a system-accessing party as a particular student 125 or proctor 115 (e.g., based on a login name or device identifier) and can verify an identity of the party by, e.g., ensuring that information entered by the party (e.g., login information) matches that in a stored account.

Account engine 205 can interact with an interface engine 215 during account generation and/or account verification to receive account information, to identify an account and/or to receive information to allow for account access.

An exam retriever 220 can retrieve one or more exam files from a central server 110 or proctor device 120. In one instance, a power file that includes a set of exam files can be retrieved. The exam file(s) can be pushed from a sending device (central server 110 or proctor device 120) or pulled by a retrieving device (proctor device 120 or student device 130). The exam file(s) can be retrieved at a set time or when a condition is satisfied. For example, the exam file(s) can be retrieved when it is less than a threshold time before an exam start time and an a registered proctor or student is logged into a retrieving proctor device or student device. As another example, the exam file(s) can be retrieved when a proctor or student enters input corresponding to a request to retrieve the exam file(s).

After the exam file(s) are retrieved, examiner retriever 220 can decrypt and/or decompress the exam file(s). Such actions can be performed immediately or at a later time, such as prior to transmitting the files to another device or to executing a file. One or more exam files (or a power file including the exam files) can be stored in an exam data store 225. The exam files can be stored in association with a course identifier, an exam start time, and/or information indicating which devices or parties are allowed to access the files.

In some instances, an exam retriever 220 on a proctor device initially retrieves one or more exam files (e.g., compressed into a power file) from a central server. This initial retrieval can be performed in advance of an exam start time. The exam files can then be cached in exam data store 225 on the proctor device. An exam retriever 220 on a student device can subsequently retrieve one or more exam files from the proctor device. The subsequent retrieval can be performed at an exam start time or shortly before. This two-part retrieval technique can reduce a system load on a central server and can further reduce dependence on network connectivity. For example, student devices may be connected via a wired connection to a proctor device, such that the second retrieval would not depend on a strength of a wireless connection.

Exam access engine 230 can evaluate one or more conditions to determine whether an exam file can be retrieved, decrypted, decompressed, executed or otherwise accessed. Evaluation of the conditions can include evaluating a current time, an identified party (e.g., one logged into a device), an input (e.g., whether a party has interred input corresponding to a request to retrieve exam files or to begin can exam), etc. For example, exam access engine 230 can allow exam-file retrieval upon receiving input from a student corresponding to a request to retrieve the exam and upon verifying that a current time is within a prescribed time window from an exam start time. It will be appreciated that a condition applicable to exam retrieval, decryption, de compression, or execution can differ from a condition applicable to another of these actions.

An exam access engine 230 on a student device can identify one or more exam files to execute or read. This selection can be based on an analysis of software installed on a student device, hardware or resources on the student device or one or more applications open on the student device. For example, exam access engine 230 can identify a browser that is open on the student device or one that is identified as being a preferred browser for that device. Exam access engine 230 can then identify one or more exam files compatible with that browser.

Upon detecting satisfaction and exam-initiation condition, exam access engine 230 can execute one or more exam files. The execution can cause the student device to be partly locked, such that the student's access to one or more applications is limited or blocked. The extent of such locking can be common across exams or can be determined based on an exam variable (e.g., such that an instructor can identify applications that the user can access during the exam). The locking may extend to the same browser that the student is using to access the exam. Thus, for example, exam questions may be presented in a tab in a browser, but the student may be prevented from opening a new tab or accessing Internet content using the browser. The prevention may occur by changing responses to traditional inputs (e.g., such that a control-T command has no effect, produces an error or pauses or ends in exam).

Execution of one or more exam files can cause one or more exam questions to be presented on a student device via interface engine 215. In some instances, exam questions can be presented on a screen of a student device using a browser that had been open prior to the exam initiation. In some instances, the presentation can further include a set of potential answers. In some instances, the presentation can include a text box where a student can enter a short answer or an essay response. In one instance, exam questions are presented one at the time. Thus, for example, a second exam question may be presented only once a response to a first exam question has been received or a student has indicated that the first exam question is to be skipped. In one instance, a set of exam questions (e.g., all exam questions) are simultaneously presented. When a presentation of the set of exam questions extends beyond a viewable portion of a page (e.g., in a browser), a student may view individual exam questions by scrolling through the page.

Interface engine 215 can receive inputs from a student during an exam period. The inputs can include text, a selection (e.g., between multiple answer options) or other inputs indicative of a response to an exam question. In some instances, an input can further indicate whether a response is to be treated as final (e.g., a selection of a "submit" button). Such indication can be associated with a single response or a set of responses (e.g. multiple responses or all responses for an exam). In some instances, a response is determined to be final regardless of such explicit indication.

A response engine 235 can map response inputs to responses for particular questions. For example, response engine 235 can determine that a particular response corresponds to a selection of answer choice D. As another example, response engine 235 can determine that a particular response corresponds to a correct answer choice. As another example, response engine 235 can associate a text response with question number 9. Response engine 235 can generate a response file for each response or for a set of responses (e.g., all responses for an exam or subset thereof). The response file can include one or more of: an identifier of a corresponding student or student device, the time at which the response was received, an answer corresponding to the response, the response itself, an indication as to whether the response was correct, an application used to view a corresponding question or to provide the response and other information. The response file can be generated upon receiving one or more responses, prior to transmitting one or more responses, at an exam end time, prior to storing one or more responses (e.g., in long-term memory). The response file can be encrypted or otherwise securely stored.

Response engine 235 can store each response (e.g., by storing a response file) in response data store 240 and/or can transmit each response (e.g., by transmitting a response file) via response transmitter 245 to a proctor device or central server. Responses can be transmitted individually or in sets. In some instances, whether responses are locally stored or how responses are stored (e.g., whether in short-term memory or long-term memory) depends on whether the responses are being or has been transmitted or whether transmission was successful. For example, responses may be stored in long-term memory only when responses of not been successfully transmitted to a proctor device or central server.

In one instance, a transmission of one or more responses is attempted upon receipt of the responses or an indication that the responses of time. In one instance, the transmission is conditioned upon other circumstances. A condition can depend upon a connection availability or strength or other factors (e.g., a previous transmission success/failure, a processing load on a student device, etc.).

A connection assessor 250 can identify a value of a connection variable (e.g., an availability of a connection or strength of a connection) and use this value to determine whether transmission should be attempted. The evaluation can include, for example, determining whether a student device is connected via a wired connection to another device, evaluating whether a wireless connection is available, evaluating a strength of a wireless connection, evaluating the success/failure of a test transmission or previous transmission (e.g., based on whether a success receipt confirmation was received from a receiving device), etc. In one instance, the value of the connection variable as compared to a threshold set forth in the transmission condition, such that the transmission is to be attempted when the value exceeds a threshold.

Thus, for example, a handling of a first request may differ from a handling of a second request. To illustrate, a first request can be automatically transmitted to a proctor device upon determining that a satisfactory wireless connection is available, while a second request can be stored instead of being transmitted upon determining that no satisfactory wireless connection is available.

The conditioned transmission can lead to circumstances where responses are locally stored beyond the time at which they were finalized, beyond an exam end time, etc. This may occur due to a previous failure to satisfy transmission condition or a previous transmission failure. Condition assessor 250 can then continue to monitor a connection variable and evaluate the transmission condition to determine when a transmission of the stored responses can be attempted. This subsequent evaluation can occur at a prescribed time interval from a past evaluation, at a prescribed time, upon receiving a request from a proctor device or central server, etc. Once the condition is satisfied, response transmitter 245 can attempt to transmit the responses (e.g., by transmitting a response file) to a proctor device or central server. In some instances, response transmitter 245 repeatedly attempts transmission (e.g., at fixed intervals) until all responses have been successfully transmitted.

It will be appreciated that, in some instances, a number of responses actually transmitted are considered for transmission (e.g., based on the assessment performed by connection assessor 250) changes. Such as change can occur due to a change in speed at which a student provides responses, a previous transmission that was unsuccessful, a previous response or set of responses that was not transmitted (e.g., due to an unsatisfactory connection), etc.

It will also be appreciated that a component of exam administration system 150 can be present on each of multiple types of devices (e.g., a proctor device and a student device). The function of the component may be similar, the same or different depending on the device type.

Figure 3:
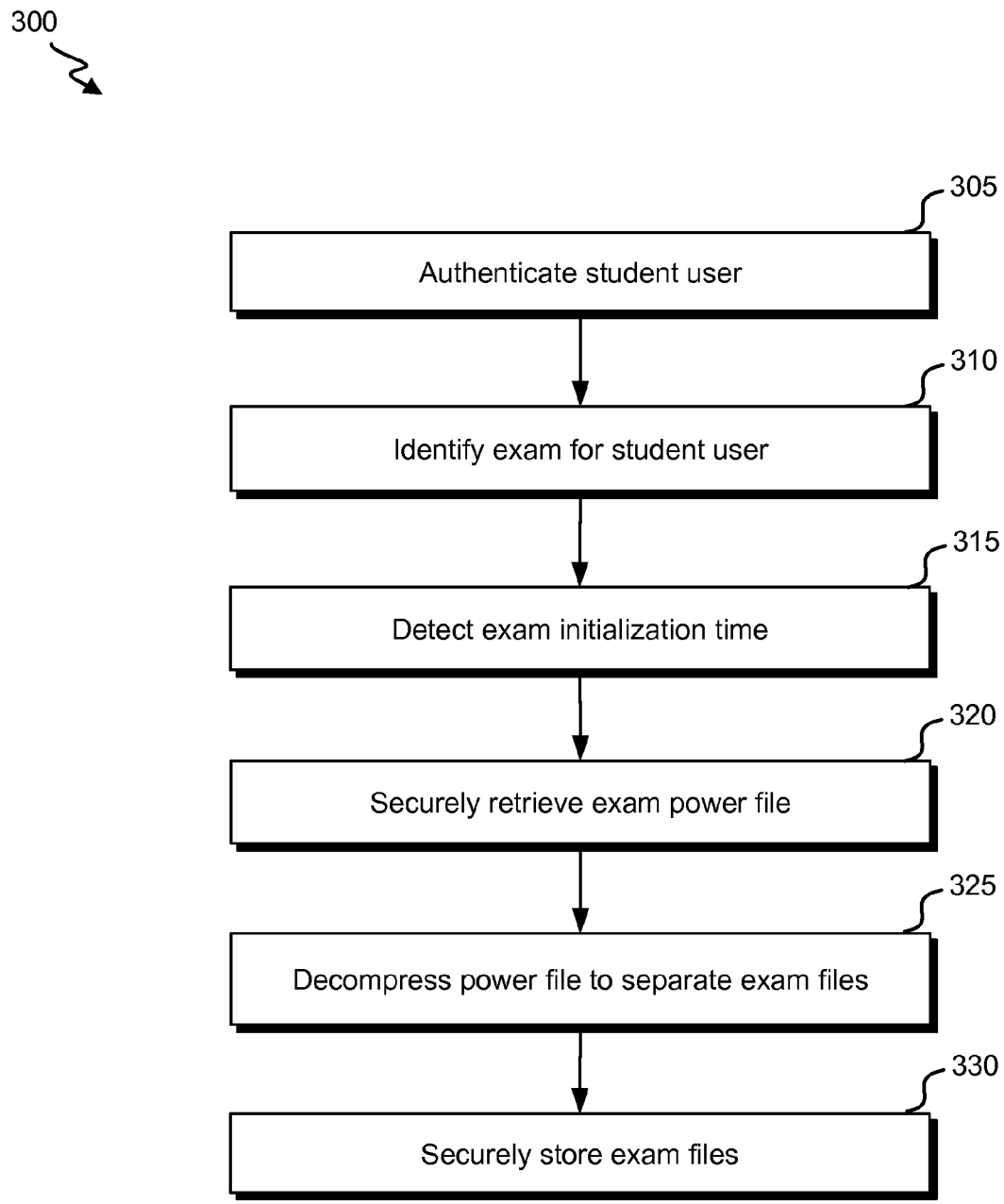
FIG. 3 illustrates a flowchart of an embodiment of a process for retrieving an exam power file at a student device.

FIG. 3 illustrates a flowchart of an embodiment of a process 300 for retrieving an exam power file at a student device. Part or all of process 300 can be implemented in a student device. Process 300 begins at block 305 where account engine 205 authenticates a student user. The authentication can include, for example, matching one or more of the login name, a student name, a student device identifier, a student identifier, to data in a student account. The authentication can further verifying that additional information (e.g., a password or token) corresponds to data in the account or associated with the account.

Exam retriever 220 identifies an exam for the student user at block 310. For example, exam retriever 220 can first identify one or more courses. The course identification can be performed by identifying one or more courses that the student is enrolled in (e.g., based on account data), by identifying a course associated with a location student device at a current time (e.g., based on which classroom the student device is in), and so on. An exam schedule associated with each of the one or more courses can be retrieved, and a current time can be mapped to each schedule. Thus, exam retriever 220 can determine whether an exam is scheduled to occur for any of the one or more courses at a current time, a current day, within a defined time period, etc. In some instances, a student user submits input response to a selection or other identification of a course and/or exam.

Exam retriever 220 detects an exam initialization time at block 315. For each exam, an initialization time or initialization time period can indicate a time at which or a time period during which exam materials can be retrieved at a student device from a remote source. The initialization time or initialization time period may be defined for a given course for a given exam (e.g., such that a proctor or instructor can at least partly define the initialization time or time period) or may be fixed across courses and/or exams. At block 315, exam retriever 220 can detect whether a current time is subsequent to the initialization time or falls within the initialization time period.

Exam retriever 220 securely retrieves an exam power file from a proctor device (or central server) at block 320. For example, exam retriever 200 and send request to the proctor device for the exam power file. The request can include an identifier of one or more of: the student device, the student, the course, the exam (e.g., as determined using a course schedule or account data), the exam power file and so on. A response to the request can then be received.

The exam power file can include a set of (e.g., compressed) exam files. One or more files in the set of files can include executable files. In some instances, at least some files in the set of files differ in terms of their compatibility. For example, one or more first files may be compatible with a first browser or piece of software and one or more second files may be compatible with a second browser or piece of software. The exam power and/or exam files in the power file can be encrypted or otherwise secured (e.g., password secured)

The student device can identify a proctor device (or central server) from which to retrieve or request the power file from based on, e.g., identifying a nearby proctor device, identifying a proctor device present on a wired connection, identifying a proctor device in a same classroom, identifying a device associated with an identifier matching one associate a course or exam (e.g., as determined based on account data or data retrieved over a network using an identifier of the student, course and/or exam), etc.

Exam retriever 220 decompresses the power file at block 325. The decompression can include unzipping the power file. The decompression can serve to convert a single power file into a set of separate exam files. In some instances, decompressing the power file includes decrypting the power file.

At block 330, exam retriever 220 securely stores the exam files in exam data store 225. Exam retriever 220 may encrypt or otherwise secure the exam files prior to storing them (e.g., in instances where exam files in the power file are not secure).

In some instances, exam data store 225 as a whole a secure. The secure storage can serve to prevent a student or student device from accessing the exam files prior to an exam start time. In some instances, an exam initialization time insubstantial and the same as an exam start time. In such cases, block 330 can be omitted from process 300.

It will be appreciated that, in some instances, exam files are not compressed at a proctor device. Thus, in some instances, block 325 may be omitted from process 300.

Figure 4:
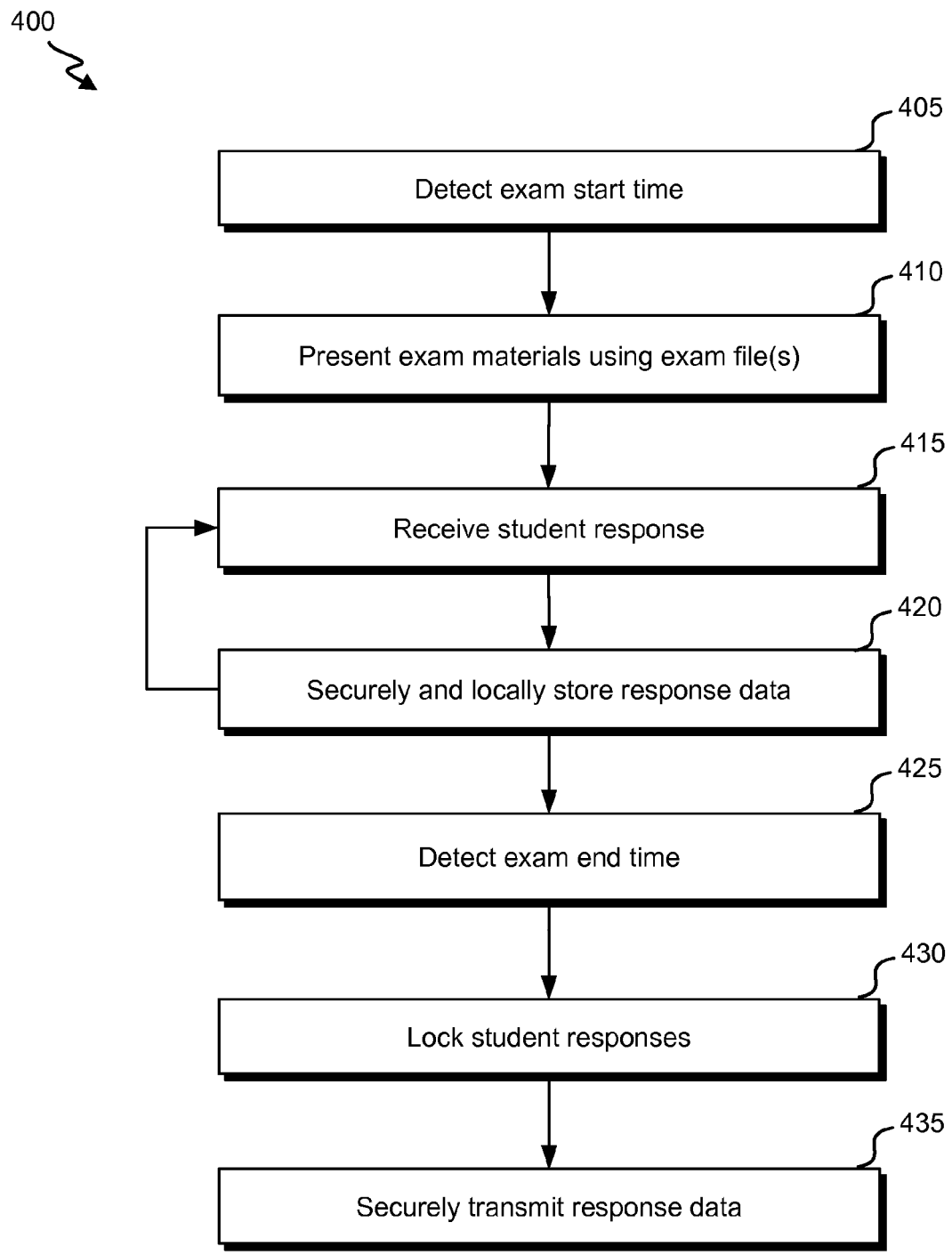
FIG. 4 illustrates a flowchart of an embodiment of a process for electronically administering an exam using an electronic student device.

FIG. 4 illustrates a flowchart of an embodiment of a process 400 for electronically administering an exam using an electronic student device. Part or all of process 400 can be implemented in a student device. Process 400 begins at block 405 where exam access engine 230 detects an exam start time. For each exam, a start time or start time period can indicate a time at which or a time period during which exam materials can presented on a student device. The start time or start time period may be defined for a given course for a given exam (e.g., such that a proctor or instructor can at least partly define the initialization time or time period) or may be fixed across courses and/or exams. In some instances, an exam start time or time period is determined based on a course time associated with a course. For example, for an 8 am course, an exam start time may be 8 am (on an exam date). At block 405, exam access engine 230 can detect whether a current time is subsequent to the exam start time or falls within the exam start time period.

In some instances, block 405 can further include detecting whether the student has provided an explicit request or implicit request (e.g., by logging into exam software) to begin an exam. In some instances, block 405 further includes detecting whether one or more other exam-start conditions are satisfied, such as determining whether the student has completed a pre-exam information form (e.g., identifying the student), determining whether exam materials are locally available, determining whether the student completed one or more pre-requisites for taking the exam.

Interface engine 215 presents exam materials at block 410. For example, exam access engine 230 can execute one or more exam files such that the exam materials are presented. The exam materials can include one or more questions and answer opportunities (e.g., answer options, text boxes, labeling abilities, etc.). Presenting exam materials can include presenting text, graphics, videos, audio streams, etc. Exam materials can be simultaneously (e.g., in a single screen or page), sequentially or conditionally presented (e.g., such that a subset of exam questions are presented at a time). Which particular question(s) are shown at a given time can depend on a question sequence, a student input (selecting a question or group of questions) and/or whether a previous response provided by the student was correct.

Interface engine 215 receives a student response at block 415. For example, a student may enter text, select a button option or other input option (e.g., an option on a drop-down menu, a slider value, a list option, etc.), click on a location on a screen (e.g., corresponding to a location in a graphic), etc. In some instances, the student response also includes input indicating that a response is complete, input indicating that a response is finalized, a request to progress to a next question, etc.

Response engine 235 can map the input received into response data. For example, a selection of an option can be mapped to a selection of a particular response. As another example, clicking on a screen location can be mapped to identifying a particular location within an image. As another example, entered text can be identified as a response. The response data can further associate the response with an identifier of one or more of: a question, a student, a student device, a response time, a course, an exam, and so on.

At block 420, response engine 235 securely stores the response data in response data store 240. Depending on the embodiment and/or circumstances, the response data may be locked such that the student is prevented from changing the stored response. Such locking can occur unconditionally, when an exam or course variable indicates that such locking is to occur, when a student indicates that a response is final or is submitted, and so on. Thus, in some instances, a subset of responses for a given exam and given student may be locked while others for the same exam and student may not.

Process 400 can return to block 415 such that additional responses can be received and stored. In some instances, process 400 returns to block 410 such that new exam material (e.g., question(s)) can be presented.

Exam access engine 230 detects an exam end time at block 425. For each exam, an end time can indicate a time at which responses are to no longer be provided or modified, exam materials are to no longer be presented on a student device and/or response data is to be transmitted from a student device to another device. The end time may be defined for a given course for a given exam (e.g., such that a proctor or instructor can at least partly define the initialization time or time period) or may be fixed across courses and/or exams. In some instances, the end time depends on a start time (e.g., the end time being a fixed duration after an exam start time). In some instances, the exam end time is determined at least partly based on student input. For example, a student may identify that an exam is complete, that responses are to be submitted, etc.

Response engine 235 locks the student's stored responses at block 430. The locking can be performed such that the student can no longer modify the responses or add responses. In some instances, the locking includes locking responses not already locked.

Response transmitter 245 securely transmits the stored response data at block 435. The responses can be transmitted to a proctor device or central server. In some instances, response data identifying all responses for an exam is transmitted in a single transmission (e.g., after an exam end time). In some instances, multiple transmissions are sent, with each including response data identifying various subsets of responses for an exam. For example, a transmission may occur or may be attempted (or a transmission condition may be evaluated) after each response is received, after each response is finalized, after each of a set of responses is received or finalized, etc.

In some instances, whether a transmission is successful or whether it is attempted influences whether and/or how response data is saved. For example, when it is determined that a transmission will occur, will be attempted or was successful, a student device may forego saving the response data or may delete the stored response data.

Figure 5:
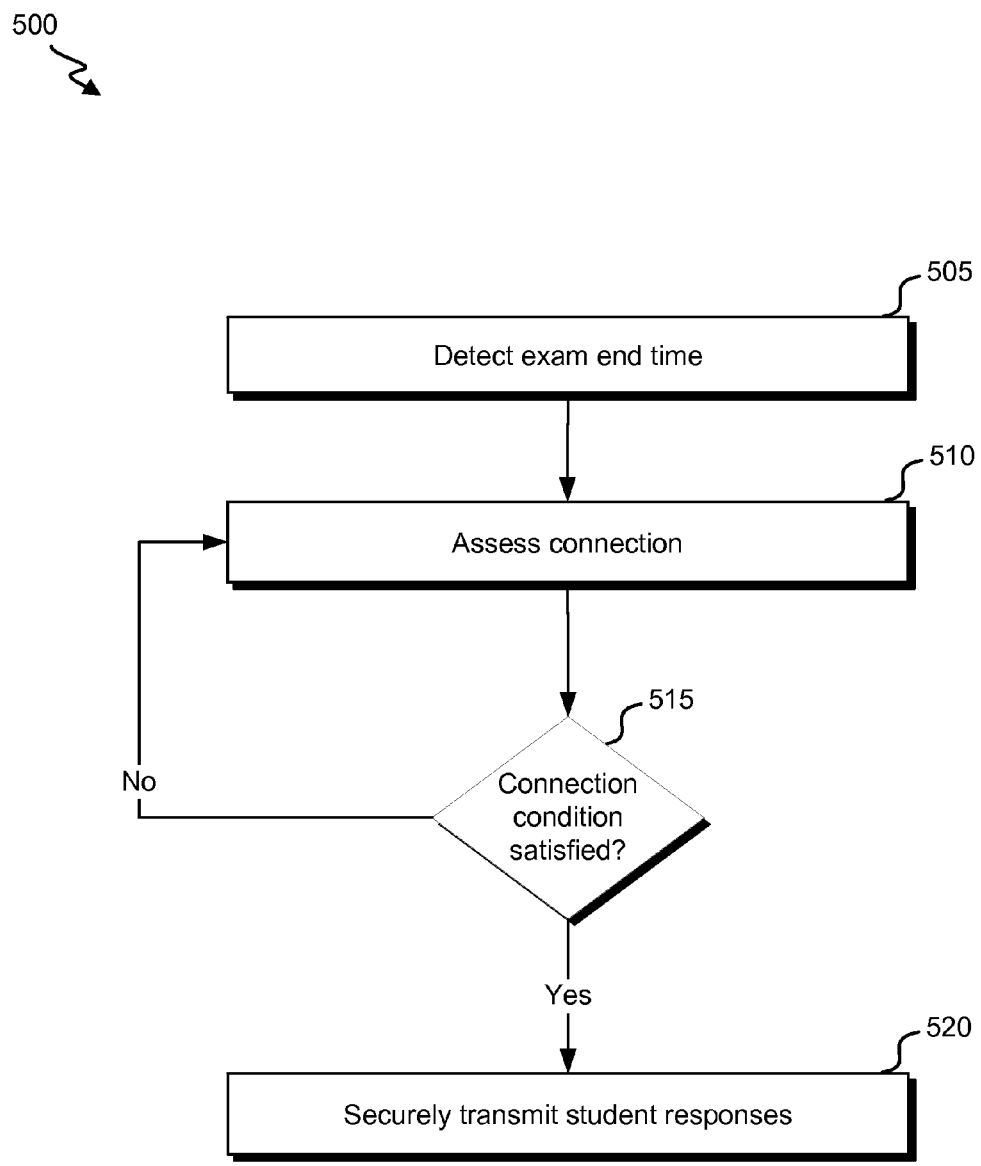
FIG. 5 illustrates a flowchart of an embodiment of a process for conditionally transmitting student responses.

FIG. 5 illustrates a flowchart of an embodiment of a process 500 for conditionally transmitting student responses. Part or all of process 500 can be implemented in a student device. Process 500 begins at block 505 where exam access engine 230 detects an exam end time. Block 505 of process 500 can parallel block 425 of process 400.

Connection assessor 250 assesses a connection at block 510. The assessment can include determining whether a connection (e.g., a wireless connection, a wired connection or either) to a network is available, whether a connection to a preferred network or to a network of a preferred type is available, determining a strength of a network, determining whether the student device can communicate with a particular other device (e.g., a proctor device or central server), etc.

A connection variable can be determined based on the assessment. For example, a connection variable can reflect a strength of a network (or a maximum network strength across all available networks), a number of networks available, a number of networks of a particular type or with a particular quality available, whether a preferred network is available, an upload speed, a download speed, whether a wired connection is available, whether a local area network is available, whether a short-range network is available, and so on.

Connection assessor 250 determines whether a connection condition is satisfied at block 515. The condition can require, for example, that a connection (e.g., a wireless connection, a wired connection or either) to a network be available, that a connection to a preferred network is available, that a connection to a network of a preferred type is available, that the student device can communicate with a particular other device, that a network strength be above a threshold, etc. In one instance, the condition requires that a request for the responses be received from another device (e.g., a proctor device) within a past particular time period.

When it is determined that the condition is satisfied, process 500 continues to block 520 where response transmitter 245 securely transmits response data (e.g., to a proctor device). Block 520 of process 500 can parallel block 435 of process 400. When it is not determined that the condition is satisfied, process 500 can return to block 510, such that a connection can be repeatedly assessed and a condition repeatedly evaluated until all response data has been transmitted.

In some instances, the return to block 510 is nearly immediate. In other instances, a delay is introduced. The delay may be, at least about, about, or less than about 1 second, 15 seconds, 30 seconds, 1 minute, 10 minutes, 30 minutes, 1 hour, 2 hours, 6 hours, 1 day or 2 days. This delay can serve to reduce repeated evaluations of same network conditions.

In some instances, a quantity of untransmitted responses may build during iterations of the loop in process 500. It will be appreciated that response data may thus be aggregated for storing and/or for transmission. Thus, for example, rather than storing or transmitting multiple units (e.g., files or communications), each including non-response information (e.g., an identifier of a student, a student device, a course and/or an exam), a single unit can include one copy of the non-response information and aggregated response information.

In some instances, process 500 further includes securely storing or caching the response data. The response data can be stored or cached regardless of whether it is determined that the condition is satisfied or not or can be stored only upon determining that the condition is not satisfied. The response data can be stored for a fixed time interval (e.g., one that is at least about 1 minute, 5 minutes, 10 minutes, 30 minutes, 1 hour, or 6 hours), until it is transmitted, until a receipt confirmation is received in response to transmission of the response data, until an available memory space drops below a threshold, until a memory space devoted to the response data and other response data crosses a threshold, and so on.

While process 500 presents an embodiment where a transmission is conditioned based on a connection, it will be appreciated that other types of conditions can additionally or alternatively be used. For example, other conditions may relate to a time since a last transmission (e.g., requiring at least a threshold interval between transmissions), a success of a last transmission (e.g., requiring improved connection assessments following a previous transmission failure), whether an exam period has ended (e.g., reducing or eliminating transmission conditions upon end of the exam period), resources available on a student device (e.g., requiring that a resource level be above or below a threshold to attempt transmission), whether a request for responses has been received from a proctor device, etc.

In some instances, following a return to block 515, a same type of variable is assessed at block 510 as was previously assessed and/or a same condition is evaluated at block 515 as was previously evaluated. In some instances, a different type of variable is assessed upon a repeat of block 510 and/or a different condition is evaluated at block 515. For example, a threshold for a connection strength in a condition may be reduced following an exam end time. As another example, a condition may initially require a threshold resource availability on a student device (e.g., so as not to interrupt the exam) while the threshold may be reduced or the resource condition eliminated once the student completes the exam. As another exam, following repeated transmission failures, a condition may require receipt of a request for response data before attempting transmission again.

While transmission of response data can be reserved for instances where an explicit condition is satisfied, it will be appreciated that transmission of response data can also or alternatively be functionally conditioned. For example, if no network is available to a student device or if a network connection is weak, transmission of the response data may not be possible. A functional condition can include instances where transmission attempts fail, where transmissions are not possible, where transmissions performed according to a transmission protocol (e.g., as set forth in an exam file and/or based on data from the student device) are not possible, and so on.

Figure 6:
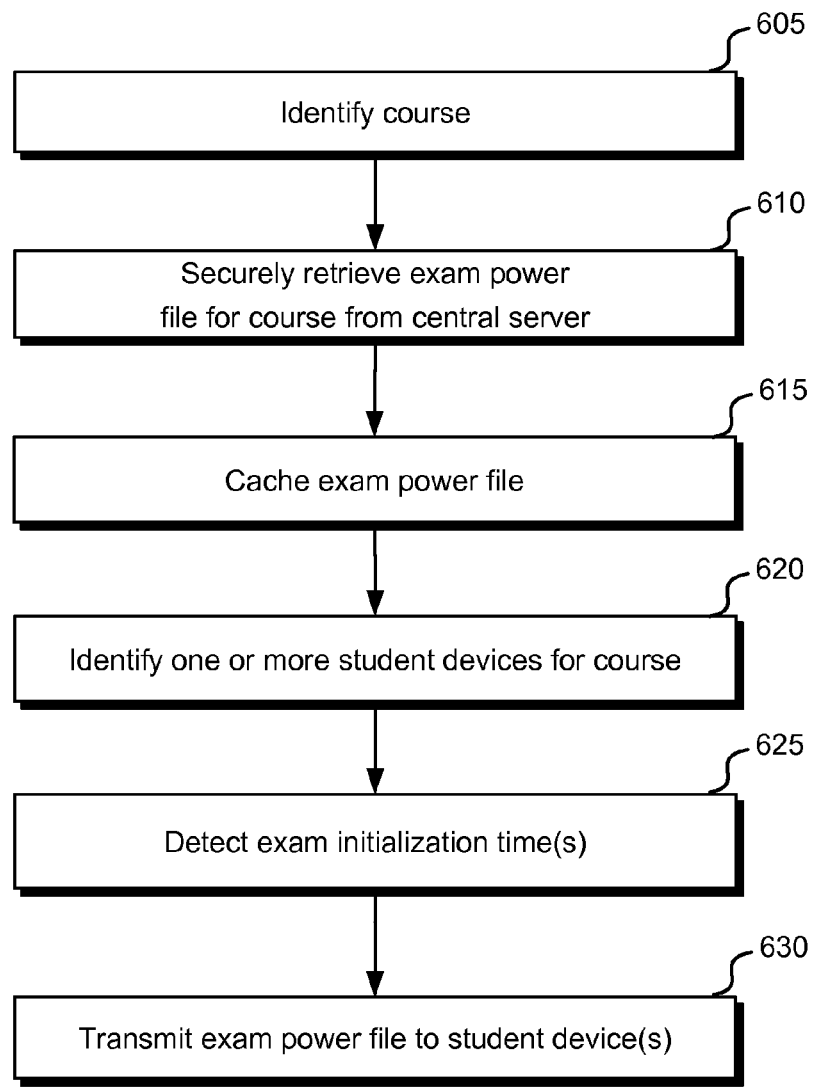
FIG. 6 illustrates a flowchart of an embodiment of a process for caching exam files on a proctor device.

FIG. 6 illustrates a flowchart of an embodiment of a process 600 for caching exam files on a proctor device. Part or all of process 600 can be implemented in a proctor device. Process 600 begins at block 605 where exam retriever 220 identifies a course. For example, a proctor device can identify a classroom that the proctor device is located in and can identify a course associated with that classroom (e.g., one having an exam or course time associated with that classroom generally or on a given day). As another example, a proctor device may locally store course information about one or more courses. As yet another example, a proctor device may identify a course based on information in a communication received from another device (e.g., from a central server).

Exam retriever 220 securely retrieves an exam power file for the course from a central server at block 610. The retrieval can be performed on a day of an exam, a set time before an exam start time (e.g., a day or week before), at an exam initialization time, etc. In one instance, retrieving the exam power file includes sending a request for the exam power file to the central server. The request can include, for example, an identifier of the proctor device, an identifier of a course, an identifier of an exam and so on. In one instance, the exam power file is pushed from the central server without requiring a request.

Along with the power file, the central server may provide information indicating when (e.g., an absolute or relative time or an absolute or relative time period) the power file is to be provided to student devices and/or which student devices are to allowed to retrieve the power file.

Exam retriever 220 caches the exam power file in exam data store resident on the proctor device at block 615. In some instances, exam retriever 220 processes the power file to, e.g., decrypt, encrypt, secure or at least partly de-secure the power file.

Exam access engine 230 identifies one or more student devices for the course at block 620. This identification can be performed using information provided (along with the power file or separately) by the central server, by a device detection technique (e.g., detecting devices on a particular network, detecting devices in a classroom or detecting nearby devices), or by analyzing information received from other devices (e.g., determining whether an exam code matches one for the power file, determining whether a student or device identifier matches one associated with the power file, etc.).

Exam access engine 230 detects one or more exam initialization times at block 625. Block 625 can parallel block 315 of process 300. In some instances, receiving a request for a power file or receiving the power file from the central server can indicate that a current time qualifies as being an exam initialization time.

A proctor-device transmitter causes the exam power file to be transmitted to one or more student devices at block 630. In some instances, the exam power file is pushed to one, some or all of the identified one or more student devices. In some instances, the exam power file is not transmitted to a student device in the identified one or more student devices until a request for the exam power file is first received. In instances where the exam power file is sent to multiple student devices, the power file may be sent to the devices simultaneously or at different times.

A period between receipt of the exam power file and transmission of the exam power file (or processed version thereof), a period between receipt of the exam power file and an exam start time, a period between request for the exam power file and transmission of the exam power file (or processed version thereof), a period between request for the exam power file and an exam start time, and/or a period of caching of the exam power file may be at least about 1 minute, 5 minutes, 30 minutes, 1 hour, 6 hours, 12 hours, 1 day, 2 days or 1 week. By caching the exam power file in advance, a system load at a common exam time can be reduced. In some instances, a schedule is developed across proctor devices or exams such that a one of the above-listed time periods is varied across exams, proctor devices, etc. Additionally or alternatively, the time period may depend at least in part on when a proctor input was received. In either case, a coordinated pre-exam load may also be reduced.

Figure 7:
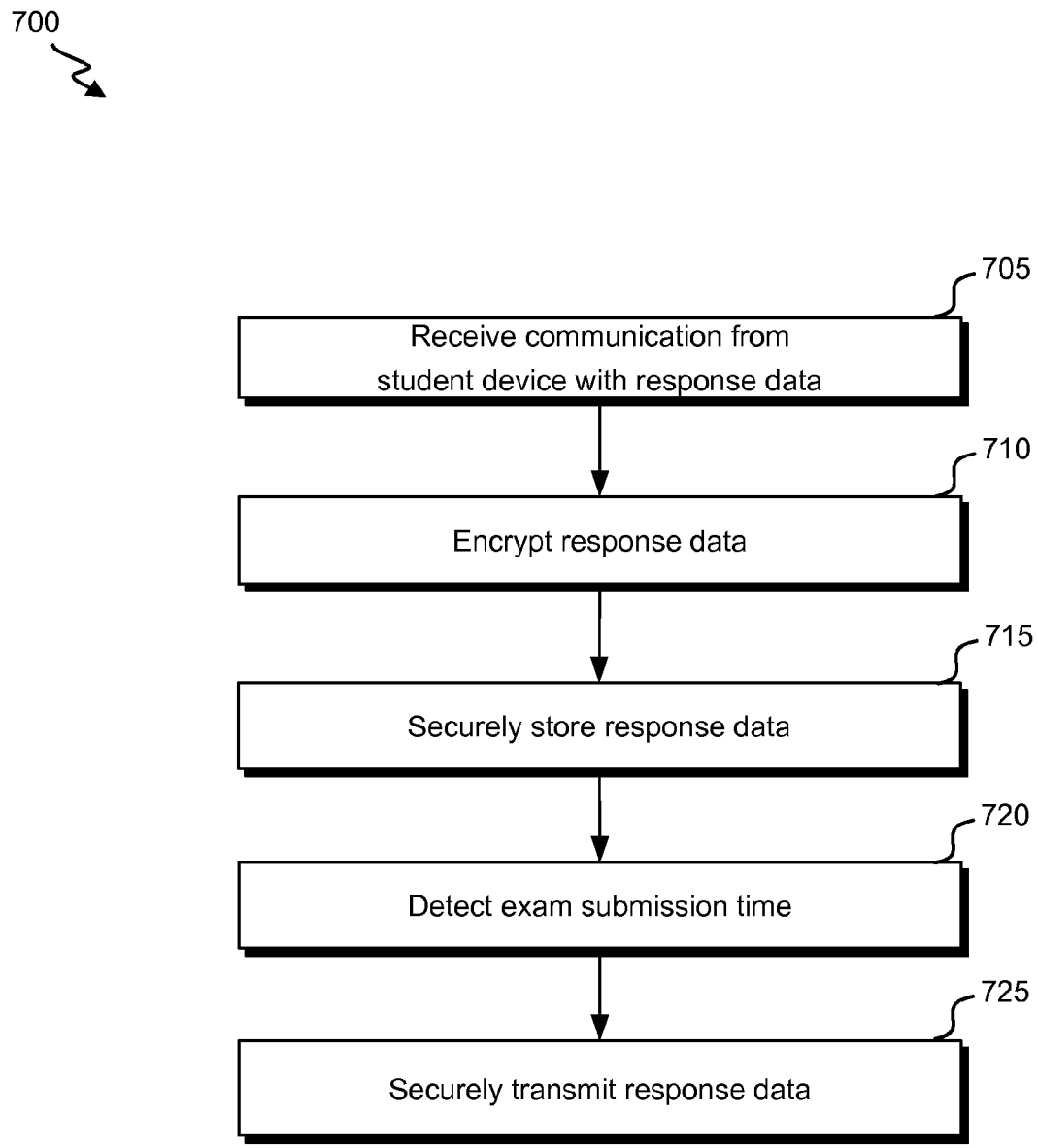
FIG. 7 illustrates a flowchart of an embodiment of a process for caching responses on a proctor device.

FIG. 7 illustrates a flowchart of an embodiment of a process 700 for caching responses on a proctor device. Part or all of process 700 can be implemented in a proctor device. Process 700 begins at block 705 where a response receiver on a proctor device receives a communication from a student device. The communication can include response data, which can include a response and, in some instances, an identifier of one or more of: a student device, a student, a course, an exam, a question, a response time and so on.

Response engine 235 encrypts or otherwise secures the response data at block 710. In some instances, the received response data is already secure and/or encrypted, and no additional securing or encryption is performed. Response engine 235 securely stores the response data at block 715.

Exam access engine 230 detects an exam submission time at block 720. The exam submission time can be identified based on data in an exam-related file, based on a communication received from a central server, based on input from a proctor (e.g., indicating that responses are to be submitted to the central server), based on a rule, etc. In one instance, a central server sends a request for responses to the proctor device, and a time of receipt of the request can serve as the exam submission time. In some instances, the exam submission time is functionally determined (e.g., determined as being a time when responses are received from all student devices in a room, all student devices that received an exam file, etc.).

Response transmitter 245 securely transmits response data to a central server at block 725. In some instances, all response data associated with an exam is transmitted in a single transmission or communication and/or substantially concurrently. In some instances, multiple transmissions with response data are sent. For example, response data for one student device or a set of student devices can be transmitted as soon as it is received.

The transmission at block 725 can be conditioned. The condition may depend on, e.g., a load on a central server, whether a response-data request has been received from a central server, a quantity of response data received, an exam end time, a network strength, a network availability, a resource load or availability on a proctor device, etc.

Figure 8:
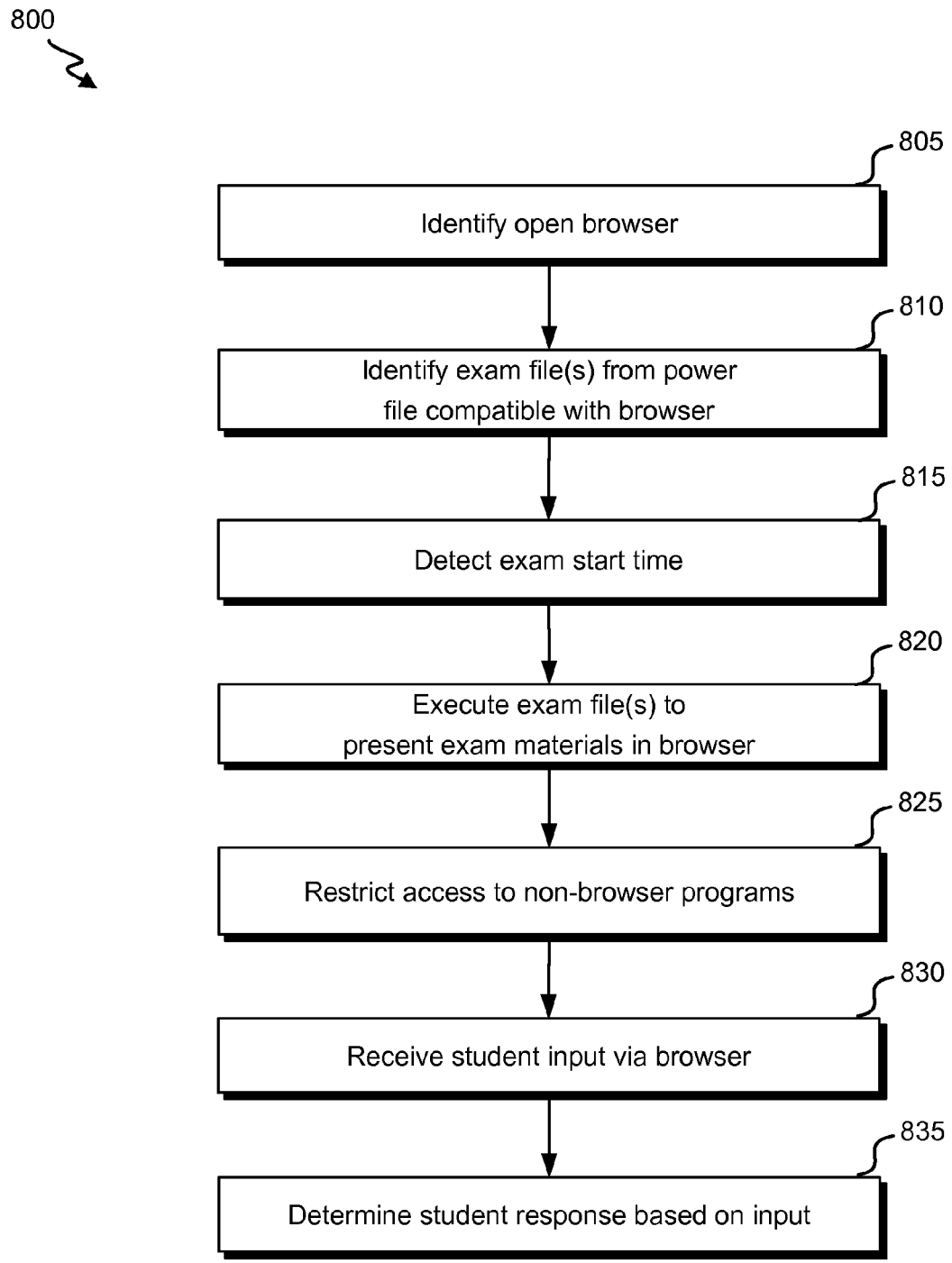
FIG. 8 illustrates a flowchart of an embodiment of a process for electronically administering an exam using a student-selected browser on a student device.

FIG. 8 illustrates a flowchart of an embodiment of a process 800 for electronically administering an exam using a student-selected browser on a student device. Part or all of process 800 can be implemented in a student device. Process 800 begins at block 805 where exam retriever 220 identifies an open browser (e.g., as being Explorer®, Chrome®, Firefox® or Safari®). In instances where multiple browsers are open, exam retriever 220 can identify a browser most recently opened, a browser which most recently was interacted with, a browser front-most on a screen, and so on.

Exam retriever 220 identifies one or more exam files from an exam power file that are compatible with the open browser at block 810. The identification can be compared by detecting metadata indicating compatibilities of files, by analyzing content of files, by evaluating a rule, by analyzing a function or file name, by analyzing an if function, and so on. In some instances, block 810 includes identifying one or more parts of exam files that are compatible with the open browser.

Exam access engine 230 detects an exam start time at block 815. Block 815 of process 800 can correspond to block 405 of process 400.

At block 820, exam access engine 230 executes at least one of the one or more exam files (or parts of the file) such that exam material is presented in the open browser. Thus, for example, if a student opens an Explorer® browser, exam questions can be presented in the Explorer® browser, and exam responses can be received via the Explorer® browser. It will be appreciated that one or more other exam files (or parts of exam files) may not have browser compatibility restrictions and can be executed at block 820 regardless of the browser identified at block 805.

Via execution of the at least one exam files or of other files, exam access engine 230 restricts access to non-browser programs at block 825. The extent of the restriction can be determined based on an exam, a course, a student device, and so on. For example, an instructor may indicate that students are allowed to access the Internet and Microsoft Word® during a test but no other applications. The central server can then generate or modify one or more exam files to enforce this restriction. An attempt to access a restricted application may result in a lack of traditional response, an error, or a negative exam occurrence (e.g., ending an exam).

Interface engine 215 receives student input via the browser at block 830. For example, a student may enter text, select a button option or other input option (e.g., an option on a drop-down menu, a slider value, a list option, etc.), click on a location on a screen (e.g., corresponding to a location in a graphic), etc. In some instances, the student response also includes input indicating that a response is complete, input indicating that a response is finalized, a request to progress to a next question, etc.

Response engine 235 determines a student response based on the input at block 835. The determination may include mapping the input to response data. For example, a selection of an option can be mapped to a selection of a particular response. As another example, clicking on a screen location can be mapped to identifying a particular location within an image. As another example, entered text can be identified as a response. The response data can further associate the response with an identifier of one or more of: a question, a student, a student device, a response time, a course, an exam, and so on.

Figure 9:
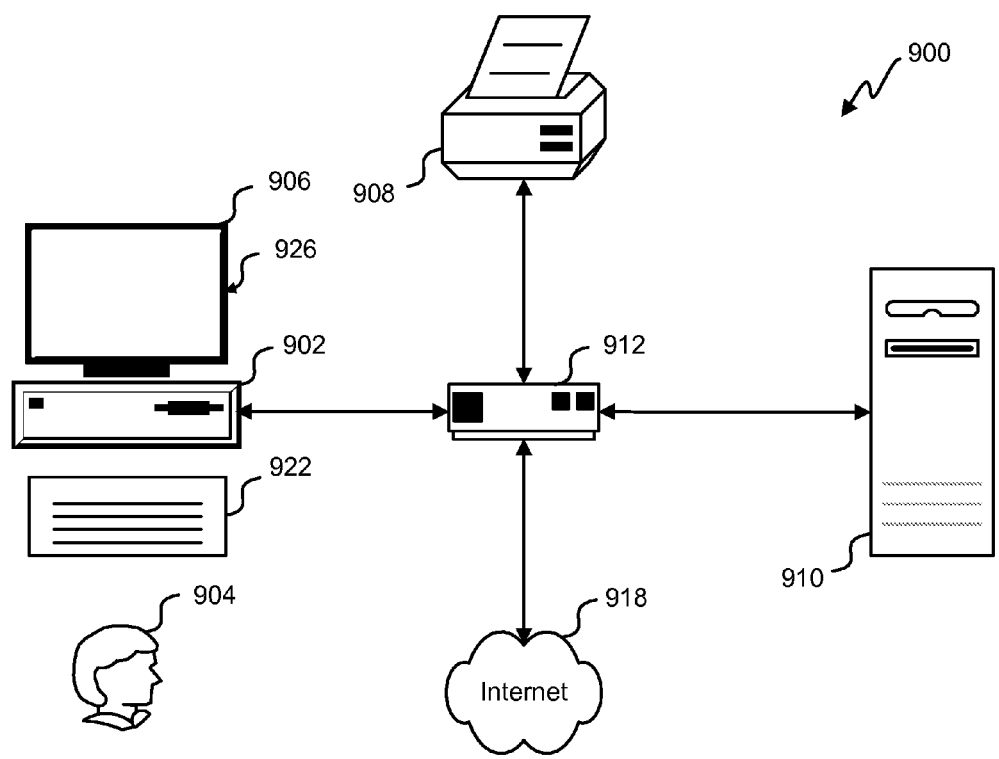
FIG. 9 depicts a block diagram of an embodiment of a computer system.

Referring next to FIG. 9, an exemplary environment with which embodiments can be implemented is shown with a computer system 900 that can be used by a designer 904 to design, for example, electronic designs. The computer system 900 can include a computer 902, keyboard 922, a network router 912, a printer 908, and a monitor 906. The monitor 906, processor 902 and keyboard 922 are part of a computer system 926, which can be a laptop computer, desktop computer, handheld computer, mainframe computer, etc. Monitor 906 can be a CRT, flat screen, etc.

A designer 904 can input commands into computer 902 using various input devices, such as a mouse, keyboard 922, track ball, touch screen, etc. If the computer system 900 comprises a mainframe, a designer 904 can access computer 902 using, for example, a terminal or terminal interface. Additionally, computer system 926 can be connected to a printer 908 and a server 910 using a network router 912, which can connect to the Internet 918 or a WAN.

Server 910 can, for example, be used to store additional software programs and data. In one embodiment, software implementing the systems and methods described herein can be stored on a storage medium in server 910. Thus, the software can be run from the storage medium in server 910. In another embodiment, software implementing the systems and methods described herein can be stored on a storage medium in computer 902. Thus, the software can be run from the storage medium in computer system 926. Therefore, in this embodiment, the software can be used whether or not computer 902 is connected to network router 912. Printer 908 can be connected directly to computer 902, in which case, computer system 926 can print whether or not it is connected to network router 912.

Figure 10:
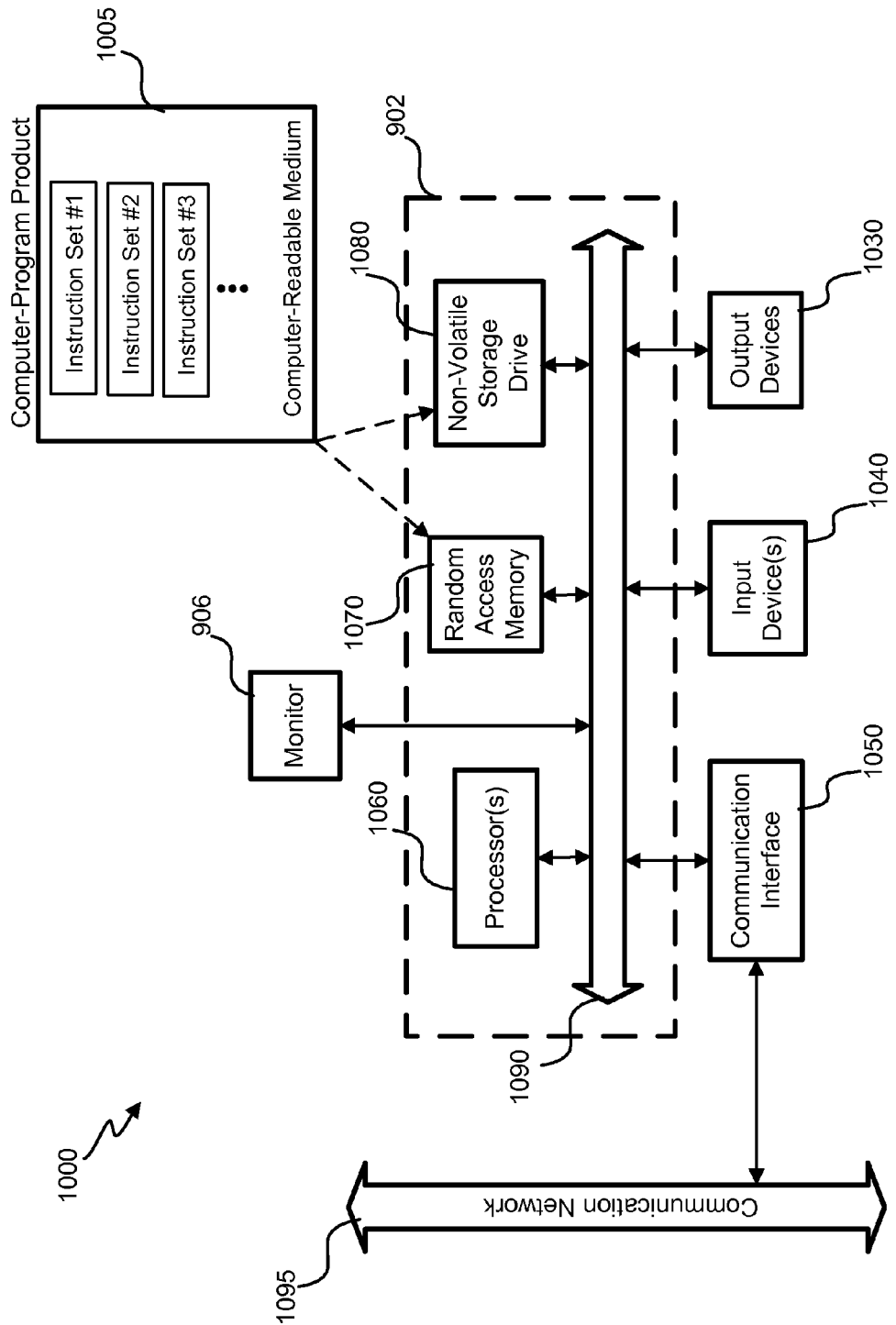
FIG. 10 depicts a block diagram of an embodiment of a special-purpose computer system.

With reference to FIG. 10, an embodiment of a special-purpose computer system 1000 is shown. Exam administration system 150 and/or any components thereof are examples of a special-purpose computer system 1000. Thus, for example, one or more special-purpose computer systems 1000 can be used to provide the function of exam administration system 150. The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 926, it is transformed into the special-purpose computer system 1000.

Special-purpose computer system 1000 comprises a computer 902, a monitor 906 coupled to computer 902, one or more additional user output devices 1040 (optional) coupled to computer 902, one or more user input devices 1035 (e.g., keyboard, mouse, track ball, touch screen) coupled to computer 902, an optional communications interface 1055 coupled to computer 902, a computer-program product 1005 stored in a tangible computer-readable memory in computer 902. Computer-program product 1005 directs system 1000 to perform the above-described methods. Computer 902 can include one or more processors 1060 that communicate with a number of peripheral devices via a bus subsystem 1090. These peripheral devices can include user output device(s) 1040, user input device(s) 1035, communications interface 1055, and a storage subsystem, such as random access memory (RAM) 1070 and non-volatile storage drive 1080 (e.g., disk drive, optical drive, solid state drive), which are forms of tangible computer-readable memory.

Computer-program product 1005 can be stored in non-volatile storage drive 1090 or another computer-readable medium accessible to computer 902 and loaded into memory 1070. Each processor 1060 can comprise a microprocessor, such as a microprocessor from Intel® or Advanced Micro Devices, Inc®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft Corporation, Solaris® from Sun Microsystems, LINUX, UNIX, and the like.

User input devices 1035 include all possible types of devices and mechanisms to input information to computer system 902. These can include a keyboard, a keypad, a mouse, a scanner, a digital drawing pad, a touch screen incorporated into the display, audio input devices such as voice recognition systems, microphones, and other types of input devices. In various embodiments, user input devices 1035 are typically embodied as a computer mouse, a trackball, a track pad, a joystick, wireless remote, a drawing tablet, a voice command system. User input devices 1035 typically allow a user to select objects, icons, text and the like that appear on the monitor 906 via a command such as a click of a button or the like. User output devices 1040 include all possible types of devices and mechanisms to output information from computer 902. These can include a display (e.g., monitor 906), printers, non-visual displays such as audio output devices, etc.

Communications interface 1055 provides an interface to other communication networks and devices and can serve as an interface to receive data from and transmit data to other systems, WANs and/or the Internet 918. Embodiments of communications interface 1055 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1055 can be coupled to a computer network, to a FireWire® bus, or the like. In other embodiments, communications interface 1055 can be physically integrated on the motherboard of computer 902, and/or can be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 can be configured to store the basic programming and data constructs that provide the functionality of various embodiments of the present invention, as described above.

Software instruction sets that provide the functionality of the present invention can be stored in RAM 1070 and non-volatile storage drive 1080. These instruction sets or code can be executed by processor(s) 1060. RAM 1070 and non-volatile storage drive 1080 can also provide a repository to store data and data structures used in accordance with the present invention. RAM 1070 and non-volatile storage drive 1080 can include a number of memories including a main random access memory (RAM) to store of instructions and data during program execution and a read-only memory (ROM) in which fixed instructions are stored. RAM 1070 and non-volatile storage drive 1080 can include a file storage subsystem providing persistent (non-volatile) storage of program and/or data files. RAM 1070 and non-volatile storage drive 1080 can also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem can utilize multiple busses or communication paths within computer 902.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for administering academic examinations and conditioning transmission of examination responses on results of a connection assessment, the system comprising:
  an exam retriever that receives, at an electronic student device, one or more electronic examination files;
  an exam access engine that executes, at the electronic student device, the one or more electronic examination files, wherein the execution causes:
    an academic exam question to be presented via an interface of the electronic student device; and
    input corresponding to a response to the academic exam question to be received via the interface;
  a response engine that, at the electronic student device:
    translates the input to the response; and
    generates response data that includes an identifier of the academic exam question, an identifier of the response, and an identifier of the electronic student device or of a student;
  a connection assessor that, at the electronic student device:
    determines one or more connection variables by assessing one or more network connections available to the electronic student device, a connection variable of the one or more connection variables being indicative of a number of networks available; and
    evaluates a transmission condition based on the one or more connection variables, the evaluation including comparing each of the at least one connection variable to a threshold, a result of the evaluation indicating that the transmission condition is satisfied when the connection variable exceeds the threshold; and a response transmitter that conditionally transmits the response data from the electronic student device, such that:

the response data is transmitted to a receiving other device at a first time when the transmission condition is satisfied; and transmission of the response data is delayed from the first time when the transmission condition is not satisfied, such that, subsequent to the delay, the response data is retrieved from storage and transmitted to the receiving device.

2. The system for electronically administering academic examinations and conditioning transmission of examination responses on results of a connection assessment as recited in claim 1, wherein the response engine further stores the response data at the electronic student device.

3. The system for electronically administering academic examinations and conditioning transmission of examination responses on results of a connection assessment as recited in claim 1, wherein the response engine further:

stores the response data at the electronic student device; and secures the stored response data subsequent to an exam end time to prevent a student from modifying the response.

4. The system for electronically administering academic examinations and conditioning transmission of examination responses on results of a connection assessment as recited in claim 1, wherein another of the at least one connection variable is indicative of a strength of at least one of the one or more connections.

5. The system for electronically administering academic examinations and conditioning transmission of examination responses on results of a connection assessment as recited in claim 1, wherein:

the exam retriever further receives, at the electronic student device, a set of electronic examination files, the set of electronic examination files including the one or more electronic examination files, the one or more electronic examination files including a first examination file compatible with a first browser, the set of electronic examination files including a second examination file compatible with a second browser; and the exam access engine further:

identifies that the first browser is open on the electronic student device; and selects the first examination file for execution based on the identification of the first browser being open, wherein the second examination file is not executed at the electronic student device.

6. The system for electronically administering academic examinations and conditioning transmission of examination responses on results of a connection assessment as recited in claim 1, wherein executing the one or more electronic examination files further causes access to at least one application on the electronic student device to be blocked during an examination period.

7. The system for electronically administering academic examinations and conditioning transmission of examination responses on results of a connection assessment as recited in claim 1, wherein the connection assessor further:

determines that the transmission condition is not satisfied; and repeatedly determines each of the one or more connection variables and evaluates the transmission condition until the transmission condition is satisfied.

8. The system for electronically administering academic examinations and conditioning transmission of examination responses on results of a connection assessment as recited in claim 1, wherein:

the academic exam question is presented via an interface of the electronic student device by presenting the academic exam question on a screen of the electronic student device, and the input corresponding to the response to the academic exam question is received via the interface by detecting a keystroke or cursor selection.

9. A computer-implemented method for electronically administering academic examinations and conditioning transmission of examination responses on results of a connection assessment, the method comprising:

receiving, at an electronic student device, one or more electronic examination files;

executing, at the electronic student device, the one or more electronic examination files, wherein the execution causes:

an academic exam question to be presented via an interface of the electronic student device; and input corresponding to a response to the academic exam question to be received via the interface;

translating, at the electronic student device, the input to the response;

generating, at the electronic student device, response data that includes an identifier of the academic exam question, an identifier of the response, and an identifier of the electronic student device or of a student;

determining, at the electronic student device, a connection variable by assessing one or more network connections available to the electronic student device;

evaluating, at the electronic student device, the evaluation including comparing the connection variable to a threshold, a result of the evaluation indicating that the transmission condition is satisfied when the connection variable exceeds the threshold; and conditionally transmitting the response data from the electronic student device to the other device, such that:

the response data is transmitted from the electronic student device to the other device at a first time when the transmission condition is satisfied; and transmission of the response data is delayed from the first time when the transmission condition is not satisfied, such that, subsequent to the delay the response data is retrieved from storage transmitted to the other device.

10. The computer-implemented method for electronically administering academic examinations and conditioning transmission of examination responses on results of a connection assessment as recited in claim 9, further comprising storing the response data at the electronic student device.

11. The computer-implemented method for electronically administering academic examinations and conditioning transmission of examination responses on results of a connection assessment as recited in claim 9, further comprising, upon determining that the transmission condition is not satisfied:

storing the response data at the electronic student device; and securing the stored response data subsequent to an exam end time to prevent a student from modifying the response.

12. The computer-implemented method for electronically administering academic examinations and conditioning transmission of examination responses on results of a connection assessment as recited in claim 9, wherein the connection variable is indicative of a strength of at least one of the one or more connections.

13. The computer-implemented method for electronically administering academic examinations and conditioning transmission of examination responses on results of a connection assessment as recited in claim 9, further comprising:
receiving, at the electronic student device, a set of electronic examination files, the set of electronic examination files including the one or more electronic examination files, the one or more electronic examination files including a first examination file compatible with a first browser, the set of electronic examination files including a second examination file compatible with a second browser;
identifying that the first browser is open on the electronic student device; and
selecting the first examination file for execution based on the identification of the first browser being open,
wherein the second examination file is not executed at the electronic student device.

14. The computer-implemented method for electronically administering academic examinations and conditioning transmission of examination responses on results of a connection assessment as recited in claim 9, wherein executing the one or more electronic examination files further causes access to at least one application on the electronic student device to be blocked during an examination period.

15. The computer-implemented method for electronically administering academic examinations and conditioning transmission of examination responses on results of a connection assessment as recited in claim 9, further comprising:
determining that the transmission condition is not satisfied; and
repeatedly determining the connection variable and evaluating the transmission condition until the transmission condition is satisfied.

16. The computer-implemented method for electronically administering academic examinations and conditioning transmission of examination responses on results of a connection assessment as recited in claim 9, wherein:
the academic exam question is presented via an interface of the electronic student device by presenting the academic exam question on a screen of the electronic student device, and
the input corresponding to the response to the academic exam question is received via the interface by detecting a keystroke or cursor selection.

17. A computer-program product tangibly embodied in a non-transitory machine-readable storage medium, including instructions configured to cause one or more data processors to perform actions including:
executing, at an electronic student device, one or more electronic examination files, wherein the execution causes:
an academic exam question to be presented via an interface of the electronic student device; and
input corresponding to a response to the academic exam question to be received via the interface;
translating, at the electronic student device, the input to the response;
generating, at the electronic student device, response data that includes an identifier of the academic exam question, an identifier of the response, and an identifier of the electronic student device or of a student;
determining, at the electronic student device, a connection variable by assessing one or more network connections available to the electronic student device;
evaluating, at the electronic student device, a transmission condition based on the connection variable, the evaluation including comparing the connection variable to a threshold, a result of the evaluation indicating that the transmission condition is satisfied when the connection variable exceeds the threshold; and
conditionally transmitting the response data from the electronic student device to the other device, such that:
the response data is transmitted from the electronic student device to the other device at a first time when the transmission condition is satisfied; and
transmission of the response data is delayed from the first time when the transmission condition is not satisfied, such that, subsequent to the delay the response data is retrieved from storage transmitted to the other device.

18. The computer program product as recited in claim 17, wherein
the actions further include storing the response data at the electronic student device.

19. The computer program product as recited in claim 17, wherein the actions further include, upon determining that the transmission condition is not satisfied:
storing the response data at the electronic student device; and
securing the stored response data subsequent to an exam end time to prevent a student from modifying the response.

20. The computer program product as recited in claim 17, wherein the connection variable is indicative of a strength of at least one of the one or more connections.

21. The system for electronically administering academic examinations and conditioning transmission of examination responses on results of a connection assessment as recited in claim 1, wherein determining that the transmission condition is not satisfied further causes the response data to be aggregated with other response data when the transmission condition is not satisfied, and wherein the response engine transmits the aggregated response data and other response data upon a subsequent determination that the transmission condition is satisfied.

22. The system for electronically administering academic examinations and conditioning transmission of examination responses on results of a connection assessment as recited in claim 7, wherein the delay is of a defined time period.

23. The system for electronically administering academic examinations and conditioning transmission of examination responses on results of a connection assessment as recited in claim 1, wherein the connection variable is indicative of a number of networks of a particular type that are available.

24. The system for electronically administering academic examinations and conditioning transmission of examination responses on results of a connection assessment as recited in claim 1, wherein the connection variable is indicative of a number of networks of a particular quality that are available.

* * * * *